Figure 1:
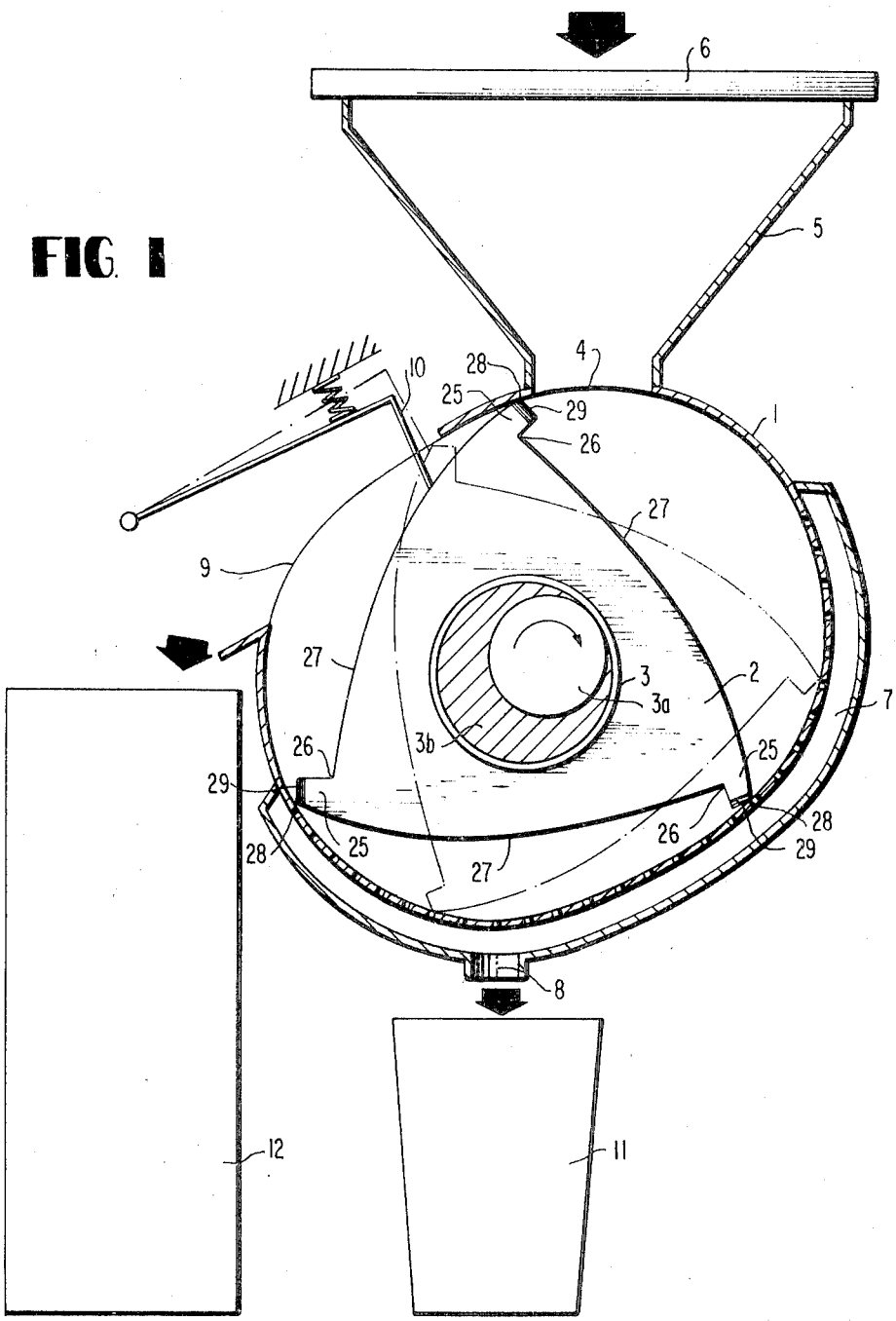

United States Patent
Preisinger et al.

[15] 3,635,151
[45] Jan. 18, 1972

[54] APPARATUS FOR RECOVERING LIQUIDS FROM LIQUID-CONTAINING SOLID MATERIALS OF DIFFERENT CONSISTENCIES, ESPECIALLY FROM FRUITS OF ANY TYPE

[72] Inventors: Franz Preisinger; Ernst Reichl, both of Oberelchingen, Germany
[73] Assignee: Gugelot Design GmbH
[22] Filed: Sept. 12, 1969
[21] Appl. No.: 857,320

[30] Foreign Application Priority Data

Sept. 13, 1968 Austria ..............................A 8967/68
Dec. 23, 1968 Germany ....................P 18 16 653.5

[52] U.S. Cl............................................100/127, 100/177
[51] Int. Cl............................................................B30b 9/06
[58] Field of Search.................100/104, 110, 121, 126, 127, 100/177

[56] References Cited

UNITED STATES PATENTS 2,121,932    6/1938    Slocum..................................100/177

FOREIGN PATENTS OR APPLICATIONS 554,205    1923    France..................................100/177
592,821    1925    France..................................100/177

Primary Examiner—Billy J. Wilhite
Attorney—Craig, Antonelli and Hill

[57] ABSTRACT

An apparatus for obtaining liquids from liquid-containing solid materials or goods of different consistency, especially from fruits, in which the pressing-out of the liquid is realized by means of a rotary piston device of trochoidal construction which automatically discharges the residue in cyclic operation.

11 Claims, 7 Drawing Figures

INVENTORS
FRANZ PREISINGER
ERNST REICHL

BY Craig, Antonelli & Hill

ATTORNEYS

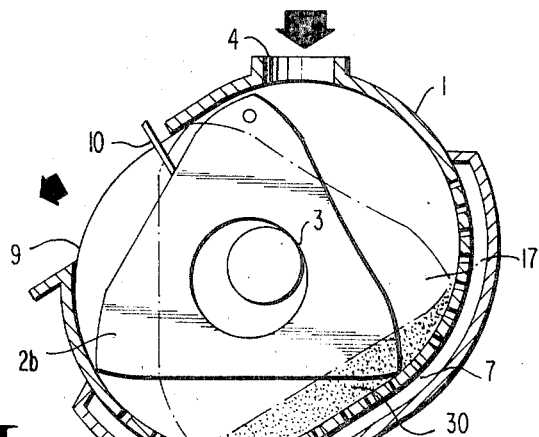
FIG. 5
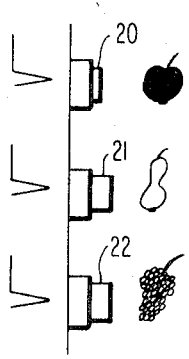
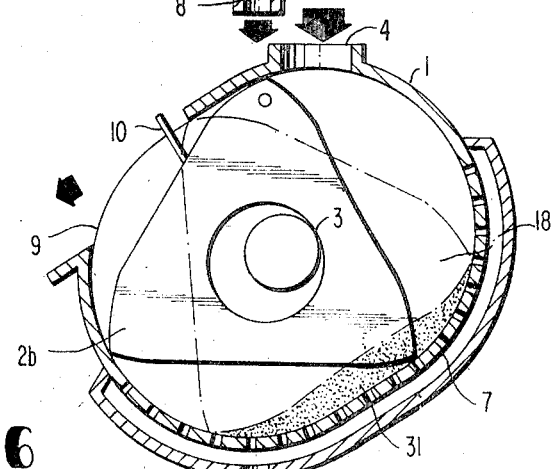
FIG. 6
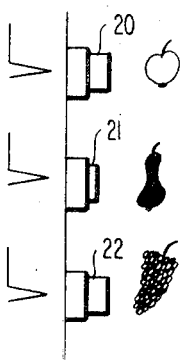
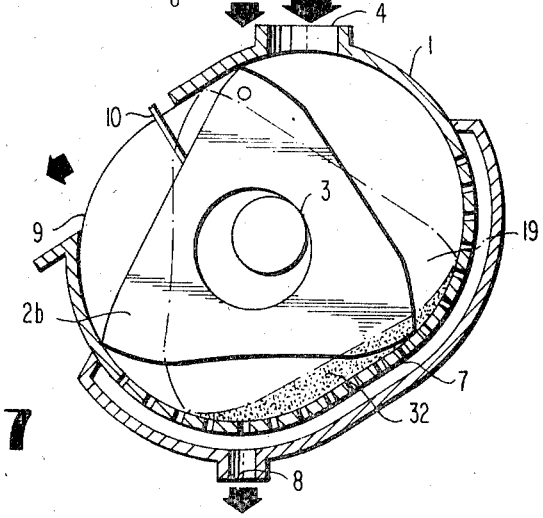
FIG. 7
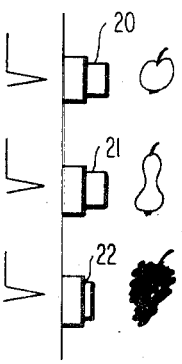
INVENTORS
FRANZ PREISINGER
ERNST REICHL
BY Craig, Antonelli & Hill
ATTORNEYS

APPARATUS FOR RECOVERING LIQUIDS FROM LIQUID-CONTAINING SOLID MATERIALS OF DIFFERENT CONSISTENCIES, ESPECIALLY FROM FRUITS OF ANY TYPE

The present invention relates to an apparatus which serves to extract liquid from liquid containing material; especially, the apparatus and installation of the present invention serves the purpose to obtain a pure juice from fruits of any type.

A large number of apparatus and installations of this type are already in existence. They differ basically as regards their application, on the one hand, as installations for the extraction of liquids, especially of juices, from solid or firm materials or goods in commercial, large-scale production operations and on the other, as apparatus of smaller and medium-size for the use in the home, in the hotel trade or for hospitals and the like. The latter type forms the object of the present invention.

Some apparatus of this type operate as centrifuges in which the shredded liquid-containing materials or goods are subjected to centrifugal force for the purpose of extracting the liquid. However, it is disadvantageous in connection therewith that the obtained juice is unstable, i.e., will keep only for a short period of time because it decomposes very rapidly as a result of the oxygen enrichment which has taken place during the centrifuging. A further disadvantage with most apparatus of this type resides in that the residue, devoid of juice, has to be removed additionally out of the apparatus after the juice extraction operation.

Furthermore, apparatus are known in the prior art in which the liquid-containing material or goods are pressed-out with the aid of a conical worm rotating in a perforated housing and in which the pressed-out materials are discharged at the end of the worm. This type of apparatus, however, is suited only for soft materials, for example, for berries; and it is also not possible with this principle of operation to obtain pure liquids because a complete separation of liquid and residue cannot be realized therewith.

These disadvantages also exist with apparatus of another type in which a pressing body in the form of a roller or drum eccentrically rotates in a housing having a filler opening for the material to be pressed out, a perforate zone for the discharge of liquid, and a discharge opening for the residue.

The construction of these devices is particularly disadvantageous for the pressing-out of fruits, because in most cases they comprise parts such as sliding vanes or the like which are movably supported in the pressing drum or rotor. The composition of the fruits being processed, and particularly their sugar content, leads to sticking of the moving parts so that they can no longer function properly. This, in turn, is the reason why pure juice can no longer be extracted, as has been said above.

All of the aforementioned apparatuses operate continuously, i.e., the material to be pressed out is fed continuously into the apparatus and, accordingly, there is a continuous discharge of liquid or juice from the apparatus. With such continuous operation it is unavoidable that there is always a residue of partly pressed-out material in the apparatus. This entails the fundamental disadvantage that it is impossible to obtain a really pure juice.

A further disadvantage of these known devices is that they are suitable for processing only a narrowly limited type of material. In other words, a given apparatus can be used only for processing berries; it cannot be used for stone fruits unless they have been suitably prepared, i.e., stoned and/or shredded, prior to pressing.

The present invention is concerned with the aim to create an apparatus of smaller to medium-size which avoids the disadvantages existing with the different, known types of systems and apparatus and which makes possible with small structural expenditures to obtain from the liquid-containing materials or goods of different consistencies pure, nonspoilable liquids.

In order to achieve these objects and to obviate the aforementioned disadvantages, the present invention proposes an apparatus for obtaining liquids from solid, liquid-containing material of different consistency, especially from fruits of any type, comprising a rotor means of substantially triangular cross section with three peripheral walls forming working surfaces, drive means for imparting a combined rotary and circular movement to said rotor means, and housing means with trochoidal internal wall means surrounding said rotor means with and having inlet means for the material to be processed, outlet means for the pressed-out liquid, and discharge means for the residue. The walls of the rotor means, during one revolution thereof, form with the internal wall means of the housing means three chambers of cyclically varying volume, whereby the liquid is extracted from the material in a cyclic process comprising the consecutive phases of filling the material into the apparatus, compressing the material to extract the liquid therefrom, and discharging the residue out of the apparatus.

Machines comprising a rotary piston or rotor of triangular cross section which executes a planetary, i.e., a combined rotary and circular, movement in a trochoidal housing are well known in mechanical engineering. A conventional application, for example, is in the form of internal combustion engines (so-called Wankel engines) or compressors.

The application, according to the present invention of a rotary piston machine to an apparatus corresponding to the type of the invention results in the advantage that after the termination of the dejuicing operation, a discharge of the residue out of the apparatus takes place automatically. The additional removal of the residue out of the apparatus, heretofore necessary for the most part with the known, prior art apparatus, can thus be dispensed with and a continuous dejuicing in cyclic operation is therefore made possible in an advantageous manner with the apparatus proposed by the present invention. Furthermore, the durability or keeping property of the pressed-out juice is not impaired since the extraction thereof takes place without the influence of centrifugal forces and thus no oxygen enrichment of the juice occurs.

According to a further feature of the present invention, the drive means for driving the rotor means include a drive shaft, and an eccentric fast therewith. The rotor means is rotatably supported on the eccentric by means of a central circular bore, and the axis of rotation of the eccentric coincides with the center of the trochoidal shape of the internal peripheral wall of the housing means. Additionally, the present invention provides that each of the peripheral walls or working surfaces of the rotor, which, together with the housing walls, form the chambers, may be of different configuration, for example, may be flattened off.

Chambers of different sizes result from such arrangement, and it is made possible thereby to bring a predetermined chamber as filling chamber into communication with the inlet aperture in the housing for the goods to be dejuiced.

As a result thereof, the apparatus may be selectively set or positioned in such a manner that in each case the chamber with the most favorable volume is available as filling chamber, due consideration being given to the differing consistency of the material to be dejuiced.

For purposes of reducing the resistance during the discharge of the dejuiced residue out of the apparatus, the present invention further provides that the corner edges of the rotor are constructed as pusher bars directed forwardly in the direction of rotation and extending over the entire or over a part of the width of the rotor, from the inwardly disposed bottom edge of which extends the corresponding working surface continuously and smoothly toward the outwardly disposed top edge of the next-following pusher bar, as viewed in the direction of rotation.

An apparatus is created by the inventive proposal which can be manufactured with low-structural expenditure and thus can be made with acceptable costs in smaller and medium sizes. In comparison with the construction and mode of operation of known devices, the apparatus according to the present invention, due to its cyclic operation, presents the advantage that during each pressing operation the residue is completely discharged. Another important advantage of the present invention resides in the fact that all kinds of juice-containing fruits may be processed with one and the same apparatus, and with the same high degree of efficiency.

Due to the different volumes of the chambers, it is possible to process material with different characteristics. Thereby, the chamber with the greatest volume serves to process fruits with big stones or kernels, e.g., peaches and the like. These stones are not crushed during pressing but become embedded in the residue and are discharged therewith. The apparatus of the present invention thereby combines all advantages which were realizable heretofore only with the one or the other type of construction whereas it simultaneously also avoids the disadvantages of all known constructions.

Figure 2:
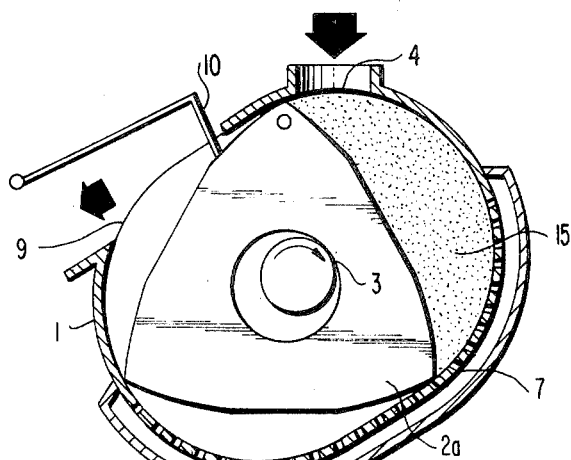
Figure 3:
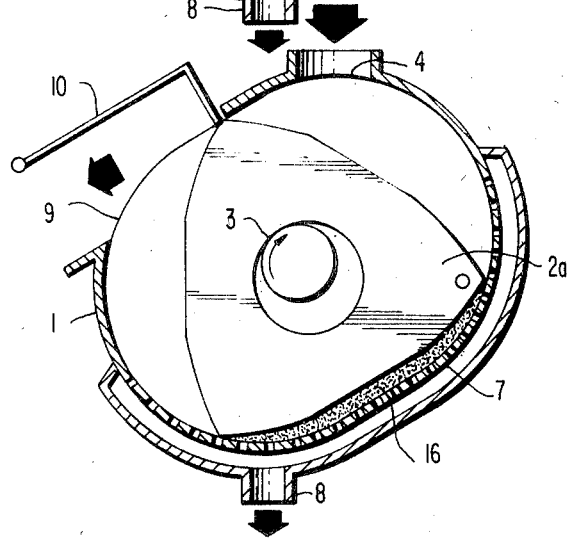
Figure 4:
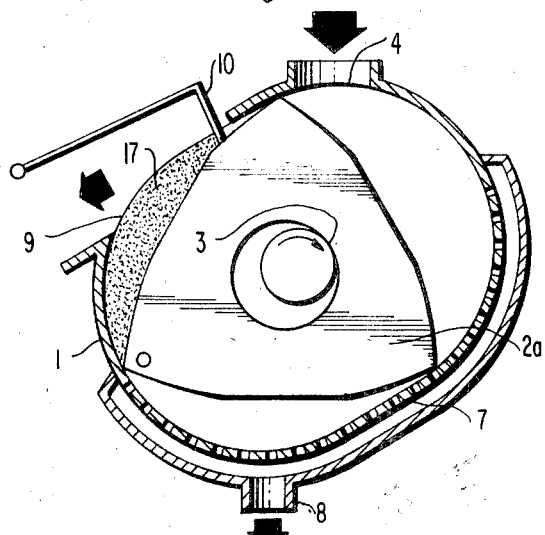

These and further objects, features, and advantages of the present invention will become more obvious from the following description when taken in connection with the accompanying drawing which shows, for purposes of illustration only, several embodiments in accordance with the present invention, and wherein:

FIG. 1 is a schematic cross-sectional view through one embodiment of an apparatus in accordance with the present invention;

FIGS. 2, 3, and 4 illustrate schematically the individual phases during one rotation of the rotor; and FIGS. 5, 6, and 7 indicate schematically the setting or adjustment of respectively different chamber volumes as filling chamber.

Referring now to the drawings wherein like reference numerals are used to designate like parts and, more particularly, to FIG. 1, a rotor 2 of substantially triangular cross section is rotatably arranged in a housing 1 with a trochoidally shaped internal peripheral wall. A combined rotary and circular, i.e., planetary, movement within the housing 1 is imparted to the rotor 2 by an eccentric drive generally designated by the reference numeral 3, and comprising a drive shaft 3a and an eccentric 3b fast with the drive shaft. The axis of rotation of the eccentric 3b coincides with the center of the trochoid forming the internal peripheral wall of the housing. The rotor 2 is rotatably supported on the eccentric 3b by means of a central circular bore. Eccentric drives of this type are well known in connection with rotary piston machines, particularly in internal combustion engines or compressors of the so-called Wankel type. Therefore, a more detailed description is dispensed with herein. The inlet aperture 4 with the filling funnel 5, adapted to be closed by means of a cover 6, is disposed in the upper part of the housing 1. The lower part of the housing 1 is made of perforated steel plating which is appropriately arranged in an interchangeable manner; it is surrounded by a collecting space 7 for the liquid, which is provided at its lowest point with a discharge aperture 8 for the obtained liquid. For the discharge of the residue, a further aperture 9 is accommodated in the housing 1, at the upper edge of which is provided a stripper or wiper 10 which abuts against the rotor 2 under spring pressure. One collecting container 11 and 12 each is organically arranged at the apparatus below the outlet aperture 8 for the liquid and below the outlet or discharge aperture 9 for the residue.

It can be seen from FIG. 1 that the corner edges of the rotor 2 are constructed as pusher bars 25 pointing in the direction of rotation, from the inwardly disposed bottom edge 26 of which extends the corresponding working surface 27 smoothly toward the outwardly disposed top edge 28 of the next-following pusher bar 25 as viewed in the direction of rotation. The individual working surfaces 27 between the pusher bars 25 may thereby be constructed differently according to the present invention whereby working chambers of different volume result.

For improving the sealing and for reducing friction, sealing bars 29 abutting against the housing walls and consisting of any appropriate, conventional synthetic resinous material are inserted into the pusher bars 25.

The operation of the rotary piston drive during one rotation of the rotor is illustrated in FIGS. 2 to 4. FIG. 2 illustrates the starting position of the rotor 2a (which for the sake of simplicity is shown without pusher bars), in which the filling chamber 15 is in communication with the inlet aperture 4. In FIG. 3 is illustrated the chamber 16 with the smallest volume; in this position of the rotor 2a, the pressing-out operation has been far-reachingly terminated, and the pressed-out liquid reaches the collecting space 7 through the perforated housing part and then flows off through the outlet aperture 8 into the container 11. In the position of the rotor illustrated in FIG. 4, the discharge of the residue takes place through the outlet aperture 9.

According to a further feature of the present invention, and as shown in FIGS. 5 to 7 the working surfaces of the rotor 2b, which together with the internal walls of the housing 1 form the chambers, are provided with mutually different flattened off surfaces whereby chambers of differing sizes result. By reference to FIGS. 5, 6 and 7, the effect of this measure will be explained. According to the present invention, the rotor 2b always occupies a predetermined starting position; corresponding to the three working surfaces of the rotor 2b, three filling chambers 17, 18 and 19 of different volume may be selected, either manually or by any other convenient means. Appropriately, the desired setting is realized electronically by suitable circuit means, the three switches 20, 21 and 22 which are advantageously characterized with descriptive or symbolic pictures for the three different goods, serving the purpose of the selective setting or adjustment of the starting position of the rotor 2b.

In FIG. 5, the switch 20 is depressed; the chamber 17 with the largest volume is thereby selected and positioned as filling chamber.

In FIG. 6, the switch 21 is depressed, and the chamber 18 of medium size is selected, whereas in FIG. 7 the switch 22 is actuated which corresponds to the adjustment or setting of the chamber 19 with smallest volume.

The drive of the apparatus may also take place in any suitable, known manner. In the illustrated embodiment, the drive takes place by means of an electric motor, (not shown) and the control takes place by electronic control means of suitable construction.

OPERATION

The cycle of a pressing-out or dejuicing operation takes place in the following sequence:

Corresponding to the materials or goods to be pressed out, one of the three shifting knobs 20, 21 or 22 is depressed and with an opened lid 6 the material to be pressed out is filled into the filling funnel 5. The rotor 2, 2a, 2b is thereby in the position corresponding to the depressed switching knob. After closure of the cover 6, the rotor 2, 2a, 2b starts to rotate. The mash is compressed by the chamber volume becoming smaller and is further displaced. The hatched areas 30, 31, 32 (FIGS. 5 to 7) represent the chamber volumes corresponding respectively to the selected filling chambers 17, 18, 19 at the end of the pressing-out phase. The pressed-out liquid leaves through the perforated housing side into the liquid-collecting space 7 and flows through the discharge aperture 8 into the collecting container 11.

The crushed materials or goods—the remains—now expand by reason of the occurring volume enlargement of the chamber and the rotor 2, 2a, 2b pushes the remains or residue through the discharge aperture 9 into the collecting container 12. The discharge of the remains is assisted by the stripper or wiper bar 10 which abuts against the rotor 2, 2a, 2b by spring pressure. The rotor then continues to rotate up to its starting position and comes to a standstill in this position. After opening of the cover 6, a new pressing-out operation may begin.

While we have shown and described only one embodiment of the present invention, it is obvious that the same is susceptible of numerous changes and modifications as known to those skilled in the art, and we therefore do not wish to be limited to the details shown and described herein but intend to cover all such changes and modifications as are within the scope of those skilled in the art.

We claim:

1. An apparatus for obtaining liquids from solid, liquid-containing materials of different consistency, especially from fruits of any type, comprising rotor means of substantially triangular cross section with three peripheral walls forming working surfaces; drive means for imparting a combined rotary and circular movement to said rotor means; and housing means with trochoidal internal wall means surrounding said rotor means and having inlet means for the material to be processed, outlet means for the pressed-out liquid, and discharge means for the residue, the walls of the rotor means forming three chambers of cyclically varying volume with the internal wall means of the housing means during one revolution of the rotor means, whereby the liquid is extracted from the material in a cyclic process comprising the phases of filling the material into the apparatus, compressing the material to extract the liquid therefrom, and discharging the residue out of the apparatus.

2. An apparatus according to claim 1, wherein the drive means includes a drive shaft and an eccentric means fast therewith, the rotor means being rotatably supported on the eccentric means by a central circular bore, and the axis of the eccentric means coinciding with the center of the trochoidal shape of the internal peripheral wall means of said housing means.

3. An apparatus according to claim 1, characterized in that the inlet means for the materials, the outlet means for the pressed-out liquids and the discharge means for the residue follow each other in the direction of rotation of the rotor means.

4. An apparatus according to claim 3, characterized by a stripper means arranged at the upper edge of the discharge means for the residue, as viewed in the direction of rotation of the rotor means, and adapted to contact the periphery of the rotor means.

5. An apparatus according to claim 1, characterized in that the admission of the solid materials takes place by way of an inlet aperture means at the circumference of the housing means during standstill of the rotor means, the rotor means being fixed thereby in a predetermined position in which the inlet aperture means is in communication with the filling chamber formed between the rotor means and the housing means.

6. An apparatus according to claim 1, characterized in that the working surfaces of the rotor means which, together with housing wall means forming the chambers, are of mutually different configuration.

7. An apparatus according to claim 6, wherein said working surfaces are flattened off.

8. An apparatus according to claim 1, characterized in that the corner edges of the rotor means are constructed as pusher bar means directed forwardly as viewed in the direction of rotation of the rotor means, a respective working surface extending smoothly from an inwardly disposed lower edge of a pusher bar means to the outwardly disposed top edge of the next-following pusher bar means as viewed in the direction of rotation.

9. An apparatus according to claim 8, characterized in that the individual working surfaces between the pusher bar means are differently shaped and working chambers with mutually different volumes are formed thereby.

10. An apparatus according to claim 8, characterized by sealing bar means abutting against the working surfaces of the housing means which are inserted in the pushing bar means.

11. An apparatus according to claim 10, characterized in that the sealing bar means are made of synthetic resinous material.

* * * * *